US012406315B1

(12) United States Patent
Gilberti et al.

(10) Patent No.: US 12,406,315 B1
(45) Date of Patent: Sep. 2, 2025

(54) USER INTERFACE FOR TRACKING DELINQUENT PAYMENTS

(71) Applicant: CoreLogic Solutions, LLC, Irvine, CA (US)

(72) Inventors: John Michael Gilberti, San Francisco, CA (US); Jennica Nicole Glaze, Vacaville, CA (US); Joy Dianna Brackeen, Irving, TX (US); Zachary T. Wiatr, Flower Mound, TX (US)

(73) Assignee: CoreLogic Solutions, LLC, Irvine, CA (US)

( * ) Notice: Subject to any disclaimer, the term of this patent is extended or adjusted under 35 U.S.C. 154(b) by 0 days.

(21) Appl. No.: 17/902,466

(22) Filed: Sep. 2, 2022

Related U.S. Application Data

(60) Provisional application No. 63/240,807, filed on Sep. 3, 2021.

(51) Int. Cl.
*G06Q 40/12* (2023.01)
*G06F 3/0482* (2013.01)

(52) U.S. Cl.
CPC ......... *G06Q 40/123* (2013.12); *G06F 3/0482* (2013.01)

(58) Field of Classification Search
CPC .............................. G06Q 40/00; G06Q 40/123
USPC ................................................... 705/35, 38
See application file for complete search history.

(56) References Cited

U.S. PATENT DOCUMENTS

| | | | | |
|---|---|---|---|---|
| 5,335,169 A | * | 8/1994 | Chong | G06Q 40/02 705/31 |
| 6,240,399 B1 | * | 5/2001 | Frank | G06Q 40/04 705/36 R |
| 2002/0091758 A1 | * | 7/2002 | Singh | G09B 29/106 701/532 |
| 2003/0093320 A1 | * | 5/2003 | Sullivan | G06Q 20/207 705/19 |
| 2003/0140064 A1 | * | 7/2003 | Klein | G06Q 10/08 |
| 2013/0054476 A1 | * | 2/2013 | Whelan | G06Q 30/02 705/306 |
| 2015/0193470 A1 | * | 7/2015 | Romaya | G06Q 30/0282 345/593 |
| 2016/0371801 A1 | * | 12/2016 | Dawson | G06F 16/29 |
| 2017/0365019 A1 | * | 12/2017 | He | G06F 16/9038 |

* cited by examiner

*Primary Examiner* — Kirsten S Apple
(74) *Attorney, Agent, or Firm* — Knobbe, Martens, Olson & Bear, LLP

(57) ABSTRACT

A delinquent payment portal system is described herein. The delinquent payment portal system can obtain transformed assessor and/or property tax data (e.g., assessor data and/or property tax data converted from one format to another format compatible with the delinquent payment portal system) from a parcel data store. The delinquent payment portal system can then use some or all of the retrieved data to generate user interface data that, when rendered by a user device, causes the user device to display a graphical user interface (GUI) depicting any of the data or features described herein, including property tax delinquency data details by land type, city, zip code, and/or other geographical area (e.g., county, state, etc.), property tax delinquency data map details, and/or property tax delinquency data year over year concurrently and/or overlapping within a single view.

20 Claims, 6 Drawing Sheets

USER INTERFACE FOR TRACKING DELINQUENT PAYMENTS

CROSS-REFERENCE TO RELATED APPLICATIONS

This application claims priority under 35 U.S.C. § 119 (e) to U.S. Provisional Application No. 63/240,807, entitled "REAL ESTATE PROPERTY TAX INSIGHTS SYSTEM AND INTERFACE" and filed on Sep. 3, 2021, which is hereby incorporated by reference herein in its entirety. This application is also related to U.S. Provisional Application No. 63/169,030, entitled "USER INTERFACE FOR TRACKING PAYMENTS" and filed on Mar. 31, 2021, to U.S. Provisional Application No. 63/234,056, entitled "IMPROVED USER INTERFACE FOR TRACKING PAYMENTS" and filed on Aug. 17, 2021, and to U.S. patent application Ser. No. 17/708,382, entitled "IMPROVED USER INTERFACE FOR TRACKING PAYMENTS" and filed on Mar. 30, 2022, which are hereby incorporated by reference herein in their entireties.

TECHNICAL FIELD

The present disclosure generally relates to a system that provides an improved user interface for tracking delinquent payments and related data activity.

BACKGROUND

Often, related sets of data are stored in different locations and/or in different data stores or databases. In some cases, related data sets stored in different locations and/or in different data stores are managed by different entities. As a result, each of the data sets may be stored in a different format, include different identifiers, and/or structured in a manner that makes joining the data sets difficult. For example, a first data set stored in one location and/or data store may include columns directed to one set of attributes. Another data set stored in a second location and/or data store may be related to the first data set and it may be desirable to join this data set with the first data set. However, this data set may include columns directed to a different set of attributes. Thus, it may be difficult for a computing system to identify whether the two data sets are related and, if so, how to join the two data sets.

SUMMARY

The systems, methods, and devices described herein each have several aspects, no single one of which is solely responsible for its desirable attributes. Without limiting the scope of this disclosure, several non-limiting features will now be discussed briefly.

One aspect of the disclosure provides a delinquent payment portal system. The delinquent payment portal system comprises memory storing computer-executable instructions. The delinquent payment portal system further comprises a hardware processor in communication with the memory, wherein the computer-executable instructions, when executed by the hardware processor, cause the hardware processor to: cause a user interface to be displayed that depicts delinquent property tax data for one or more parcels in a table view; process a selection to view a map view; cause the user interface to be updated to display a geographical map corresponding to a geographic area in which the one or more parcels are located; in response to a selection of a first layer corresponding to a first land type and a selection of a second layer corresponding to a second land type, cause the geographical map to depict the first layer and the second layer concurrently; and in response to an interaction with the first layer, cause the updated user interface to display a tooltip indicating the delinquent property tax data corresponding to the first layer.

The delinquent payment portal system of the preceding paragraph can include any sub-combination of the following features: where the computer-executable instructions, when executed, further cause the hardware processor to process a selection of a type of tooltip breakdown, wherein the delinquent property tax data corresponding to the first layer that is indicated in the tooltip is dependent on the selected type of tooltip breakdown; where the selected type of tooltip breakdown comprises a land type; where the delinquent property tax data corresponding to the first layer that is indicated in the tooltip comprises a percentage of a total amount of delinquent payments in a geographic area that comprises the one or more parcels that is attributable to a land type of the first layer; where the first and second layers at least partially overlap; where the first layer is depicted with a first color and the second layer is depicted with a second color different than the first color; where the first layer is depicted with a color having a shade of a first degree and the second layer is depicted with the color having a shade of a second degree different than the first degree; where the delinquent property tax data comprises, for the one or more parcels, at least one of an account name associated with the respective parcel, a tax identifier associated with the respective parcel, an amount of property tax for the respective parcel that is delinquent, a year in which a delinquent property tax for the respective parcel was first billed, an installment with which the delinquent property tax for the respective parcel was first billed, a land type of the respective parcel, a city within which the respective parcel resides, or a zip code within which the respective parcel resides; and where the first land type comprises one of vacant, single family residence, condominium, utilities, agricultural, commercial, retail, warehouse, service, hotel, motel, or duplex.

Another aspect of the disclosure provides a computer-implemented method comprising: causing a user interface to be displayed that depicts delinquent property tax data for one or more parcels in a table view; receiving a selection to view a map view; causing the user interface to be updated to display a geographical map corresponding to a geographic area in which the one or more parcels are located; in response to a selection of a first layer corresponding to a first land type and a selection of a second layer corresponding to a second land type, causing the geographical map to depict the first layer and the second layer concurrently; and in response to an interaction with the first layer, causing the updated user interface to display a tooltip indicating the delinquent property tax data corresponding to the first layer.

The computer-implemented method of the preceding paragraph can include any sub-combination of the following features: where the computer-implemented method further comprises receiving a selection of a type of tooltip breakdown, wherein the delinquent property tax data corresponding to the first layer that is indicated in the tooltip is dependent on the selected type of tooltip breakdown; where the selected type of tooltip breakdown comprises a land type; where the delinquent property tax data corresponding to the first layer that is indicated in the tooltip comprises a percentage of a total amount of delinquent payments in a geographic area that comprises the one or more parcels that is attributable to a land type of the first layer; where the first and second layers at least partially overlap; where the first layer is depicted with a first color and the second layer is depicted with a second color different than the first color; where the first layer is depicted with a color having a shade of a first degree and the second layer is depicted with the color having a shade of a second degree different than the first degree; where the delinquent property tax data comprises, for the one or more parcels, at least one of an account name associated with the respective parcel, a tax identifier associated with the respective parcel, an amount of property tax for the respective parcel that is delinquent, a year in which a delinquent property tax for the respective parcel was first billed, an installment with which the delinquent property tax for the respective parcel was first billed, a land type of the respective parcel, a city within which the respective parcel resides, or a zip code within which the respective parcel resides; and where the first land type comprises one of vacant, single family residence, condominium, utilities, agricultural, commercial, retail, warehouse, service, hotel, motel, or duplex.

Another aspect of the disclosure provides a non-transitory, computer-readable storage medium comprising computer-executable instructions, wherein the computer-executable instructions, when executed by a computing system, cause the computing system to: cause a user interface to be displayed that depicts delinquent property tax data for one or more parcels in a table view; process a selection to view a map view; cause the user interface to be updated to display a geographical map corresponding to a geographic area in which the one or more parcels are located; in response to a selection of a first layer corresponding to a first land type and a selection of a second layer corresponding to a second land type, cause the geographical map to depict the first layer and the second layer concurrently; and in response to an interaction with the first layer, cause the updated user interface to display a tooltip indicating the delinquent property tax data corresponding to the first layer.

The non-transitory, computer-readable storage medium of the preceding paragraph can include any sub-combination of the following features: where the first and second layers at least partially overlap, and wherein the first layer is depicted with a first color and the second layer is depicted with a second color different than the first color.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF SPECIFIC EMBODIMENTS

Figure 1:
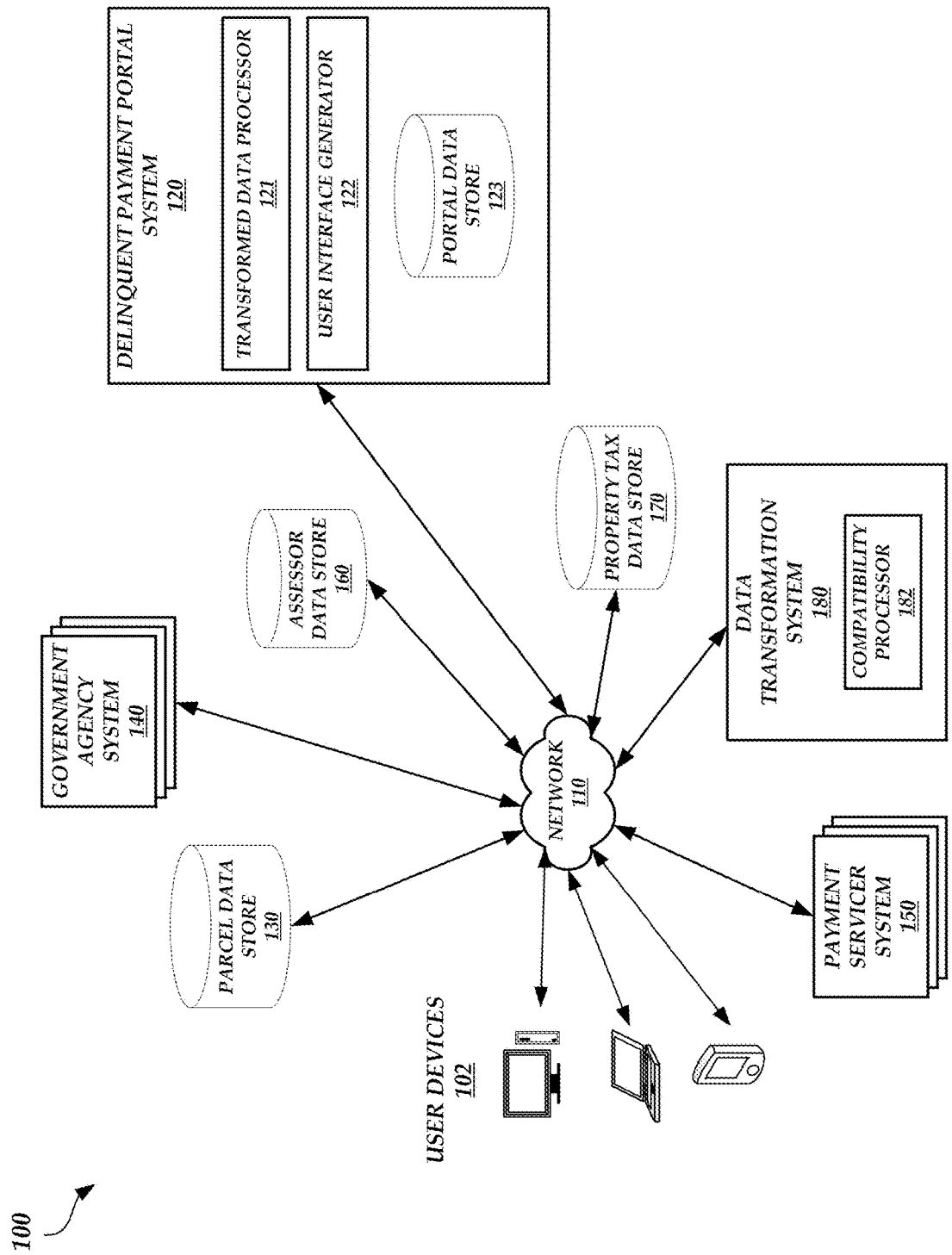
FIG. 1 is a block diagram of an illustrative operating environment in which a delinquent payment portal system 120 obtains data from different source(s) and generates user interface data that results in the display of an interactive user interface that depicts real-time delinquent payment tracking.

As explained above, related sets of data are often stored in different locations and/or in different data stores or databases. In some cases, related data sets stored in different locations and/or in different data stores are managed by different entities. As a result, each of the data sets may be stored in a different format, include different identifiers, and/or structured in a manner that makes joining the data sets difficult.

For example, government agencies that collect taxes like property taxes (referred to herein as "tax collectors") may manage one or more computing systems that store tax roll data. The tax roll data may include information on various parcels, including an identification of an owner of the respective parcel, an assessor's parcel number (APN) of the respective parcel, a tax identifier associated with the respective parcel, an identification of a street address of the respective parcel, an identification of a city, state, and/or zip code in which the respective parcel is located, a number of property tax installments due for the respective parcel, and/or an amount of property tax due for the respective parcel.

In some cases, a financial institution (e.g., a bank, a credit union, etc.) may service a mortgage or other loan and collect property taxes on behalf of a parcel owner on a periodic basis (e.g., once a month, once every 2 weeks, etc.). At certain times during the year, the financial institution (referred to herein as a "payment servicer") may transmit collected property taxes to the tax collectors. The payment servicers may each manage one or more computing systems that are separate from the computing system(s) managed by the tax collectors and that store servicer information. The servicer information can include information on various parcels, including an identification of a financial institution collecting the tax payment for the respective parcel, a code associated with the financial institution collecting the tax payment for the respective parcel, a tax identifier associated with the respective parcel, an identification of a name of a person holding an accounting with the financial institution collecting the tax payment for the respective parcel, an identification of a street address of the respective parcel, an identification of a city, state, and/or zip code in which the respective parcel is located, an amount of property tax collected for the respective parcel during a particular tax period, an amount of property tax anticipated to be collected for the respective parcel during a particular tax period, an amount of property tax anticipated to not be collected for the respective parcel during a particular tax period, a change in the amount of property tax anticipated or not anticipated to be collected for the respective parcel during a particular tax period, an amount of property tax that is delinquent for the respective parcel during a particular tax period, and/or the like.

In a given region (e.g., county, state, country, etc.), there may be hundreds to thousands of different tax collectors. While the tax collectors may generally store the same type of data, existing computing systems managed by the tax collectors do not store the data in a common or standard format. In fact, data standardization is a major issue with existing computing systems. For example, many existing computing systems lack full data documentation, making it difficult to identify the type of data stored therein. In addition, there may be variations in the comprehensiveness, attribute definitions, formats, and accuracy of data stored in the existing computing systems. In some cases, the methods by which data stored in existing computing systems is validated may be different and/or unclear, resulting in uncertainty as to the accuracy of the data stored therein. Existing computing systems often have wide variations in the nomenclature and definitions used for data attributes. Moreover, existing computing systems often include incorrectly identified and/or duplicate values for similar data attributes. Similarly, there may be hundreds to thousands of different payment servicers. While the payment servicers may generally store the same type of data, existing computing systems managed by the payment servicers do not store the data in a common or standard format and may suffer from the same deficiencies described above with respect to existing computing systems managed by tax collectors.

Given that a payment servicer may be providing the tax collector directly or indirectly with a tax payment instead of the parcel owner, it may be desirable for the payment servicer and the tax collector to be able to share information so that the payment servicer has access to data that accurately identifies the amount of property tax that is owed and so that the tax collector has access to data that accurately identifies the amount of property tax and/or the amount of non-payment that the tax collector should expect from the payment servicer and/or the amount of property tax that is delinquent (e.g., the amount of property tax that was owed and not paid during a prior payment period). However, because the data stored by each tax collector may be in a different format and the data stored by each payment servicer may be in a different format, it can be difficult to impossible for the tax collectors and payment servicers to synchronize their data in order to perform the desired sharing of information.

Furthermore, the technical operation of electronically transferring funds from one account to another can be complicated. For example, electronically wiring funds from one account to another requires having the correct account number, routing number, bank information, and/or the like. Once funds are received in an account subsequent to a wire transfer, further wire transfers may be automatically triggered to route some or all of the funds to one or more different accounts. In some cases, a computing system may trigger an automatic electronic wire transfer if the funds are available at a particular time (e.g., a particular, minute, hour, day, etc.). Tax collectors may be entities that manage computing system(s) that trigger automatic wire transfers to a government entity, a third party that completes tax payment processing, and/or any other entity described herein. Thus, it may be important to tax collectors to have accurate information on the exact time at which funds from payment servicers are expected to be transferred electronically to reduce the likelihood of errors in automatically-triggered electronic wire transfers.

Existing systems provide no mechanism for integrating data from disparate sources, let alone a mechanism for providing up-to-date tracking of electronic wire transfers. While some computing system(s) operated by tax collector (s) or payment servicer(s) may be able to obtain data from disparate sources, existing systems further do not provide a user interface that includes features that allow all of the relevant information to be displayed to the user within a single view. Rather, the existing computing systems and applications often display different data in different pages, tabs, and/or windows and/or include scroll bars to allow vertical and/or horizontal navigation. For example, one window may include a table displaying delinquent tax data and another window may include a table displaying servicer information. Thus, existing computing systems and applications are unable to display all of the relevant data within a single view, which causes a user to perform additional navigational steps (e.g., scrolling, selecting items or menus, selecting page numbers, browsing back and/or forward, etc.) to view the relevant data. The inability to view relevant data within a single view can cause a user to miss critical data, such as timing windows during which electronic payments may be received by a managed computing system, which could interrupt or cause a failure in future electronic wire transfers. Any interruption in a future electronic wire transfer may result in additional computing resources (e.g., processing power, memory, network bandwidth, etc.) of the tax collectors' computing system(s) being allocated to resolve the wire transfer errors and/or to reinitiate the electronic wire transfers, which can reduce the amount of computing resources available to the tax collectors' computing system(s) to process electronic wire transfers that are currently being received and/or to trigger electronic wire transfers to other accounts and ultimately increase the computing system(s)' electronic wire transfer processing and/or triggering latency.

Accordingly, described herein is a delinquent payment portal system that generates a delinquent tax user interface that addresses the technical deficiencies described above. For example, the delinquent payment portal system can obtain transformed assessor and/or property tax data (e.g., assessor data and/or property tax data converted from one format to another format compatible with the delinquent payment portal system) from a parcel data store. The delinquent payment portal system can then use some or all of the retrieved data to generate user interface data that, when rendered by a user device, causes the user device to display a graphical user interface (GUI) depicting any of the data or features described herein, including property tax delinquency data details by land type, city, zip code, and/or other geographical area (e.g., county, state, etc.), property tax delinquency data map details, and/or property tax delinquency data year over year concurrently and/or overlapping within a single view.

The interactive user interface may reduce the number of navigational steps taken by a user to view relevant data given that the structure of the content depicted in the interactive user interface is such that relevant data can be displayed within a single view. For example, a user may be able to view any relevant data without having to perform additional navigational steps, such as scrolling horizontally or vertically (e.g., scrolling to view a below-the-fold portion of the user interface, which may be the portion of the user interface that is not initially visible once the user interface is rendered and displayed and that is only visible after a scrolling action is performed), navigating to different pages, tabs, and/or windows, and/or the like. In other words, any relevant data that a user wishes to view may be available in the above-the-fold portion of the user interface (e.g., the portion of the user interface that is initially visible once the user interface is rendered and displayed). The interactive user interface may also reduce electronic wire transfer processing and/or triggering latency given that real-time delinquent payment tracking information is displayed therein (e.g., delinquent payment information that is current as of at least a few seconds or a few milliseconds before the interactive user interface is generated and displayed) and a user is therefore less likely to miss critical data (e.g., timing windows during which electronic payments may be received by a managed computing system), which increases the likelihood that funds are available in an account at an expected time and therefore decreases the likelihood that errors in automatically-triggered electronic wire transfers occur.

While the present disclosure describes the delinquent payment portal system as providing tools for allowing a user to track delinquent property tax payments, this is not meant to be limiting. The operations described herein as being performed by the delinquent payment portal system can be performed to track any type of payment or operation status. The operations described herein can also be performed by the delinquent payment portal system to track expected payment delinquencies by land type, city, zip code, geographical area (e.g., county, state, etc.), and/or the like.

The foregoing aspects and many of the attendant advantages of this disclosure will become more readily appreciated as the same become better understood by reference to the following detailed description, when taken in conjunction with the accompanying drawings.

Example Delinquent Payment Portal Environment

FIG. 1 is a block diagram of an illustrative operating environment 100 in which a delinquent payment portal system 120 obtains data from different source(s) and generates user interface data that results in the display of an interactive user interface that depicts real-time delinquent payment tracking. The operating environment 100 further includes a parcel data store 130, one or more government agency systems 140, one or more payment servicer systems 150, an assessor data store 160, a property tax data store 170, and a data transformation system 180 that may each communicate with the delinquent payment portal system 120 via a network 110. Furthermore, the operating environment 100 includes various user devices 102 that may communicate with the delinquent payment portal system 120 to view real-time delinquent payment tracking.

The assessor data store 160 can store assessor data for one or more parcels in one or more geographic regions. For example, the assessor data can include an assessor parcel number (APN) of a parcel, a tax identifier, a subdivision of a parcel, a lot number of a parcel, a tract number of a parcel, a block number of a parcel, a physical street address of a parcel (e.g., street number, street name, city, zip code, county, state, country, etc.), geographic coordinates (e.g., latitude and/or longitude) of a boundary of a parcel, a name of an owner of a parcel, structure information on the parcel (e.g., number of bedrooms, number of bathrooms, year built, etc.), an estimated value of a parcel and/or a structure located on the parcel (e.g., tax assessment, appraisal value, listing price, etc.), land type of a parcel (e.g., vacant, single family residence, condominium, utilities, agricultural, commercial, retail, warehouse, service, hotel or motel, duplex, etc.), and/or the like. While the assessor data store 160 is depicted as being located external to the delinquent payment portal system 120, this is not meant to be limiting. For example, not shown, the assessor data store 160 can be located internal to the delinquent payment portal system 120.

The property tax data store 170 can store property tax data for one or more parcels in one or more geographic regions. The payment servicer system(s) 150 may populate the property tax data store 170 with the property tax data. The property tax data can include, for one or more parcels, a tax identifier, an amount of property tax collected for the respective parcel during a particular tax period, an amount of property tax anticipated to be collected for the respective parcel during a particular tax period, an amount of property tax anticipated to not be collected for the respective parcel during a particular tax period, a change in the amount of property tax anticipated or not anticipated to be collected for the respective parcel during a particular tax period, an amount of property tax that is delinquent for the respective parcel during a particular tax period, bill year and/or installment for which a delinquent tax payment is due for the respective parcel, and/or the like. While the property tax data store 170 is depicted as being located external to the delinquent payment portal system 120, this is not meant to be limiting. For example, not shown, the property tax data store 170 can be located internal to the delinquent payment portal system 120.

The data transformation system 180 can be a computing system having memory storing computer-executable instructions and one or more hardware processors in communication with the memory, where the computer-executable instructions, when executed by the one or more hardware processors, cause the hardware processor(s) to obtain assessor data from the assessor data store 160, obtain property tax data from the property tax data store 170, and transform the assessor and/or property tax data. For example, a compatibility processor 182 of the data transformation system may transform (e.g., convert) the assessor data and/or the property tax data from one format to another format compatible with the delinquent payment portal system 120. The compatibility processor 182 can store the transformed data in the parcel data store 130. In one instance, the transformed data that the compatibility processor 182 stores in the parcel data store 130 may be current assessor and/or property tax data. The compatibility processor 182 can also transform historical assessor and/or property tax data and store the transformed historical data in the parcel data store 130. As an illustrative example, the compatibility processor 182 may transform the historical assessor and/or property tax data into a Viper file format for pivotal application service (PAS) loading.

The data transformation system 180 can perform the transformation operation and/or storage operation periodically (e.g., as new assessor data and/or property tax data is obtained or stored in the assessor data store 160 and/or property tax data store 170, at fixed intervals, etc.). Thus, the parcel data store 130 may include different sets of transformed data that each corresponding to a particular period of time.

The parcel data store 130 may store parcel data for one or more parcels in one or more geographic regions. For example, parcel data may include, for a parcel, geographical boundaries of the parcel, an identifier (e.g., an address, an APN, an alphanumeric value that links one more APNs, etc.) of the parcel, an identification of an owner of the parcel, an identification of a country or state in which the parcel is located, transformed assessor and/or property tax data for the parcel, and/or the like. While the parcel data store 130 is depicted as being located external to the delinquent payment portal system 120, this is not meant to be limiting. For example, not shown, the parcel data store 130 can be located internal to the delinquent payment portal system 120.

The delinquent payment portal system 120 can be a computing system having memory storing computer-executable instructions and one or more hardware processors in communication with the memory, where the computer-executable instructions, when executed by the one or more hardware processors, cause the hardware processor(s) to obtain transformed assessor and/or property tax data from the parcel data store 130 and/or generate user interface data that, when processed, causes a user device 102 to render and display an interactive user interface that depicts a real-time tracking of delinquent property tax payments. The delinquent payment portal system 120 may be a single computing device, or it may include multiple distinct computing devices, such as computer servers, logically or physically grouped together to collectively operate as a server system. The components of the delinquent payment portal system 120 can each be implemented in application-specific hardware (e.g., a server computing device with one or more ASICs) such that no software is necessary, or as a combination of hardware and software. In addition, the modules and components of the delinquent payment portal system 120 can be combined on one server computing device or separated individually or into groups on several server computing devices. In some embodiments, the delinquent payment portal system 120 may include additional or fewer components than illustrated in FIG. 1.

In some embodiments, the features and services provided by the delinquent payment portal system 120 may be implemented as web services consumable via the communication network 110. In further embodiments, the delinquent payment portal system 120 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The delinquent payment portal system 120 may include various modules, components, data stores, and/or the like to provide the data integration and delinquent payment tracking functionality described herein. For example, the delinquent payment portal system 120 may include a transformed data processor 121, a user interface generator 122, and a portal data store 123.

The transformed data processor 121 can obtain transformed assessor and/or property tax data from the parcel data store 130 and transform or perform other operations on the retrieved data in order to produce the data that can be displayed in the GUIs generated by the user interface generator 123. For example, the transformed data processor 121 can extract certain information from the transformed assessor and/or property tax data (e.g., land type of a parcel, city within which a parcel is located, zip code within which a parcel is located, geographical coordinates of a boundary of a parcel, delinquent tax payments over one or more tax periods, etc.) and provide the extracted information to the user interface generator 122. The transformed data processor 121 can further store the transformed data in the portal data store 123.

The parcel data processor 121 can obtain the transformed assessor and/or property tax data periodically (e.g., a threshold time prior to a property tax payment deadline, every hour, every day, every week, etc.) and optionally perform the transformation operation when obtained. Thus, the parcel data processor 121 may obtain different sets of transformed assessor and/or property tax data corresponding to different time periods and perform the transformation operation on some or all of the obtained sets. In some cases, the amount of a property tax that is delinquent may change, and therefore the parcel data processor 121 can track periodically updates to a delinquent payment status for one or more parcels.

The user interface generator 122 can use data obtained from the parcel data processor 121 and/or the portal data store 123 (e.g., transformed assessor data and/or property tax data) to generate user interface data that, when processed by a user device 102, causes the user device 102 to render and display an interactive user interface, such as one or more of the user interfaces described below with respect to FIGS. 2-5. For example, the user interface(s) generated by the user interface generator 122 may depict secured property (e.g., physical buildings, land, etc.) data at a summary level (e.g., dollar amounts, parcel counts, percentages) or at a summary with parcel level (e.g., tax ID (tax collector), land type (assessor), owner name (assessor), property address (assessor), tax year (tax collector), installment (tax collector), bill type (tax collector), billed amount (tax collector), base amount delinquent (tax collector), etc.), property tax delinquency rates (e.g., current year data, prior year data, exemption data) within a particular geographic region (e.g., city, county, state, etc.), comparisons by geographic region (e.g., current property tax installment comparisons month to month, year over year, etc.; current tax year installment comparisons year over year; etc.), property tax delinquency rates broken out by land type (e.g., agricultural, amusement-recreation, apartment, commercial, commercial condominium, condominium, duplex, exempt, financial institution, hospital, hotel, motel, industrial, industrial heavy, industrial light, miscellaneous, office building, parking, retail, service, single family residence, transport, utilities, vacant, warehouse, etc.) property tax delinquency rates broken out by geographic or spatial zones (e.g., which can include single, double, and/or multi boundary overlay views of county boundaries, city boundaries, school districts, zip codes, voting or legislative districts, tax supervisor districts, utility districts, power boundaries, area codes, flood zones, zoning boundaries, etc.), and/or the like.

The user interface(s) generated by the user interface generator 122 may include filters that allow a user to determine various information, including a total number of parcels in a county or other geographic region, a total number of escrow and/or non-escrow parcels serviced and for which information is available via the respective user interface, property tax delinquency rates by current tax year, property tax delinquency rates by current installment, a prior year flag that indicates whether a parcel is associated with a delinquent tax payment in a prior year, property tax delinquency rates by prior tax year (e.g., breakdown by base amount, year, installment, penalty, and/or interest), an exemption flag that indicates whether a parcel is associated with a particular tax exemption, a penalty and/or interest breakdown for delinquent tax payments, a current property tax installment comparison within a particular geographic region (e.g., month to month, year over year, etc.), a tax year comparison year over year within a particular geographic region for a current installment and/or a prior installment, property tax delinquency rates broken out by land type (e.g., where the respective user interface depicts a percentage by land type category, only those land types that have a delinquency rate that is greater than a user-specified threshold (e.g., 30%, 50%, etc.), etc.), a multi-family flag that indicates that a land type that has a particular property tax delinquency rate includes multi-family dwellings, property tax delinquency rates broken out by land type with parcel level detail depicted therein, property tax delinquency rates broken out by geographical or spatial zones (e.g., county boundaries, city/town boundaries, school district, zip codes, voting or legislative districts, tax supervisor districts, utility districts, power boundaries, area codes, flood zones, zoning boundaries, etc.) with a single boundary overlay (e.g., where the GUI depicts a percentage by spatial zone type, only those spatial zones that have a delinquency rate that is greater than a user-specified threshold (e.g., 30%, 50%, etc.), etc.), property tax delinquency rates broken out by geographical or spatial zones with a double boundary overlay (e.g., where the GUI depicts a percentage by spatial zone type, only those spatial zones that have a delinquency rate that is greater than a user-specified threshold (e.g., 30%, 50%, etc.), etc.), property tax delinquency rates broken out by geographical or spatial zones with a multi boundary overlay (e.g., where the GUI depicts a percentage by spatial zone type, only those spatial zones that have a delinquency rate that is greater than a user-specified threshold (e.g., 30%, 50%, etc.), etc.), a multi-family flag that indicates that a spatial zone that has a particular property tax delinquency rate includes multi-family dwellings, an indication of a percentage of geographical or spatial zones that have a certain property tax delinquency rate that have one or more tax exemptions, a comparison of one county or other geographic region against one or more other counties or geographic regions in the same state that are optionally of a similar size (e.g., current property tax delinquency rates of the compared counties, prior property tax delinquency rates of the compared counties, year of year property tax delinquency rates of the compared counties, etc.), a comparison of one county or other geographic region against one or more other counties or geographic regions in a different state that are optionally of a similar size (e.g., current property tax delinquency rates of the compared counties, prior property tax delinquency rates of the compared counties, year of year property tax delinquency rates of the compared counties, etc.), add-on data (e.g., data provided by tax collectors in specific geographic regions, such as tax data (e.g., escrow loans, non-escrow loans (e.g., Los Angeles County in California, Coconino County in Arizona, etc.), DELFUS loans (e.g., Los Angeles County in California, Coconino County in Arizona, etc.), forbearance loans, etc.), open source data (e.g., tourism data that indicates areas with high, medium, or low tourism, unemployment data that indicates areas with high, medium, or low unemployment, etc.), third party data (e.g., multi-family rent data), county data (e.g., data associated with penalty cancellation applicants, calamity tax relief applicants, etc.), assessor data, spatial or geographic data, valuation data, insurance data, hazard data (e.g., flood data, hail data, wind data, earthquake data, etc.), parcel detail data, home value data, property history, etc.), and/or the like.

Each government agency system 140 may be operated or managed by a different tax collector and/or third party entity associated with (e.g., hired by) a government entity. A government agency system 140 can be a computing system having memory storing computer-executable instructions and one or more hardware processors in communication with the memory, where the computer-executable instructions, when executed by the one or more hardware processors, cause the hardware processor(s) to perform any of the operations described herein as being performed by a government agency system 140. The government agency system 140 may be a single computing device, or it may include multiple distinct computing devices, such as computer servers, logically or physically grouped together to collectively operate as a server system. The components of the government agency system 140 can each be implemented in application-specific hardware (e.g., a server computing device with one or more ASICs) such that no software is necessary, or as a combination of hardware and software. In addition, the modules and components of the government agency system 140 can be combined on one server computing device or separated individually or into groups on several server computing devices. In some embodiments, the government agency system 140 may include additional or fewer components than illustrated in FIG. 1.

Each payment servicer system 150 may be operated or managed by a different payment servicer. A payment servicer system 150 can be a computing system having memory storing computer-executable instructions and one or more hardware processors in communication with the memory, where the computer-executable instructions, when executed by the one or more hardware processors, cause the hardware processor(s) to perform any of the operations described herein as being performed by a payment servicer system 150. The payment servicer system 150 may be a single computing device, or it may include multiple distinct computing devices, such as computer servers, logically or physically grouped together to collectively operate as a server system. The components of the payment servicer system 150 can each be implemented in application-specific hardware (e.g., a server computing device with one or more ASICs) such that no software is necessary, or as a combination of hardware and software. In addition, the modules and components of the payment servicer system 150 can be combined on one server computing device or separated individually or into groups on several server computing devices. In some embodiments, the payment servicer system 150 may include additional or fewer components than illustrated in FIG. 1.

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. A user device 102 may execute an application (e.g., a browser, a stand-alone application, etc.) that allows a user, such as an agent of a tax collector and/or a property owner, to access, view, and manipulate an interactive user interface, such as the user interfaces described below with respect to FIGS. 2-5.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Example User Interfaces

FIGS. 2-5 illustrate an example user interface 200 that may be displayed by a user device 102 in response to processing user interface data generated by the user interface generator 122. The user interface data, when processed by the user device 102, may cause the user device 102 to render and display the user interface 200. As a user makes selections or otherwise interacts with the user interface 200, the delinquent payment portal system 120 may transmit to the user device 102 updated user interface data that, when processed, causes the user device 102 to render and display updated versions of the user interface 200.

Figure 2:
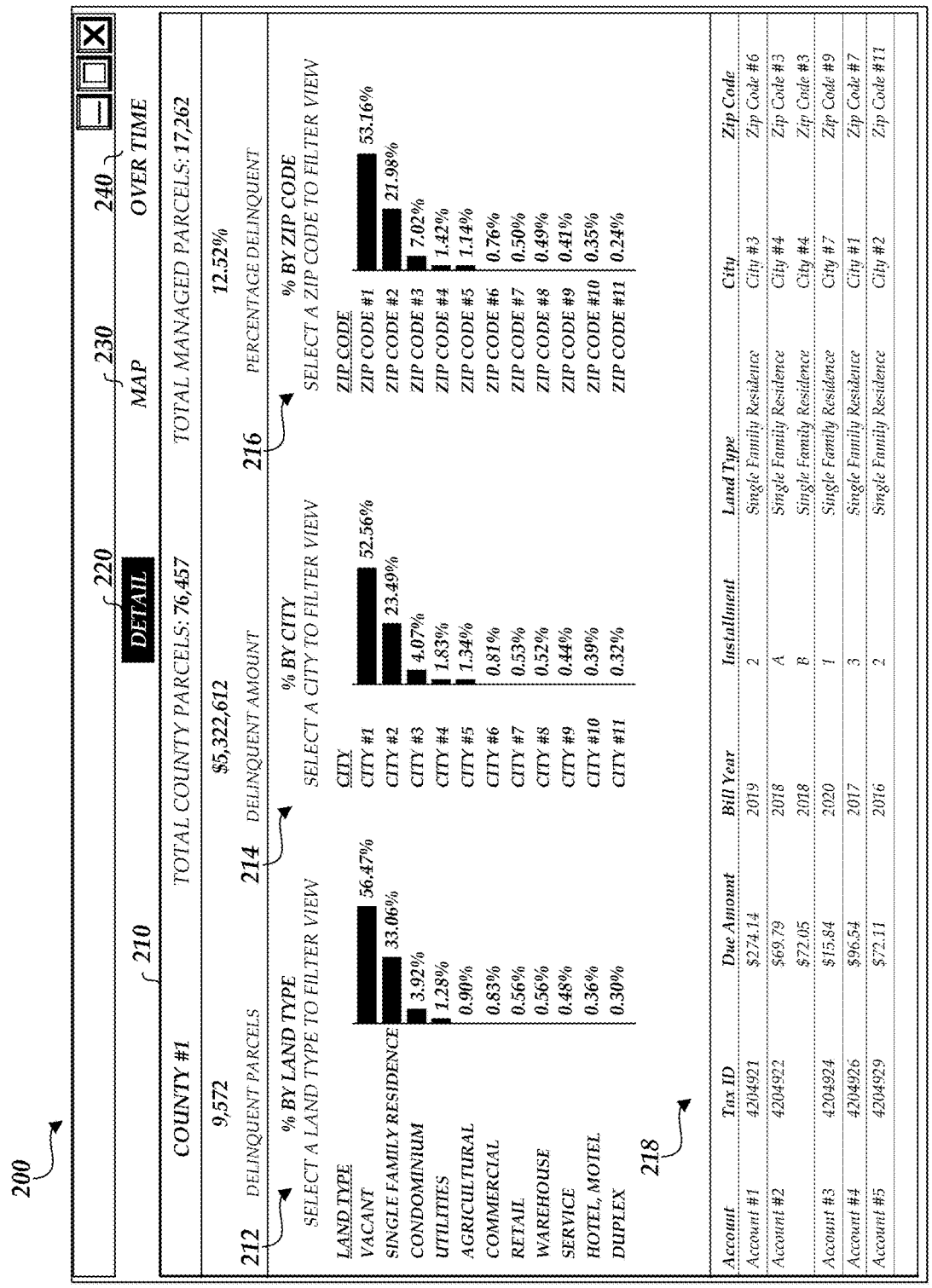
FIGS. 2-5 illustrate an example user interface that may be displayed by a user device 102 in response to processing user interface data generated by the user interface generator 122.

For example, the user interface 200 illustrated in FIG. 2 includes a window 210 that depicts property tax delinquency data for different land types, cities, and zip codes within a particular county (e.g., county #1) or other jurisdiction. Specifically, the user interface 200 depicts a percentage of land types, a percentage of cities, and a percentage of zip codes within the county that have property tax delinquencies. The percentages may be depicted in table form. For example, table 212 depicts the percentage of property tax delinquencies within the county that correspond to parcels of a particular land type. Table 214 depicts the percentage of property tax delinquencies within the county that correspond to parcels within a particular city. Table 216 depicts the percentage of property tax delinquencies within the county that correspond to parcels within a particular zip code.

The window 210 also include a table 218 that depicts a scrollable list of specific property tax delinquency information for one or more parcels for which property tax payments are or are not delinquent. For example, the table 218 may include, for one or more parcels, an account name associated with the respective parcel, a tax ID associated with the respective parcel, an amount of property tax for the respective parcel that is delinquent or owed, a year in which the delinquent property tax for the respective parcel was first billed, an installment with which the delinquent property tax for the respective parcel was first billed, a land type of the respective parcel, a city within which the respective parcel resides, and a zip code within which the respective parcel resides. While the table 218 depicts several assessor and/or property tax data items, this is not meant to be limiting. The table 218 can depict additional assessor and/or property tax data and/or less assessor and/or property tax data than what is illustrated in FIG. 2.

The user interface 200 further depicts the number of delinquent parcels in the county, the total amount of delinquent property tax payments originating from the county, and the percentage of parcels in the county that have property tax delinquencies.

Figure 3:
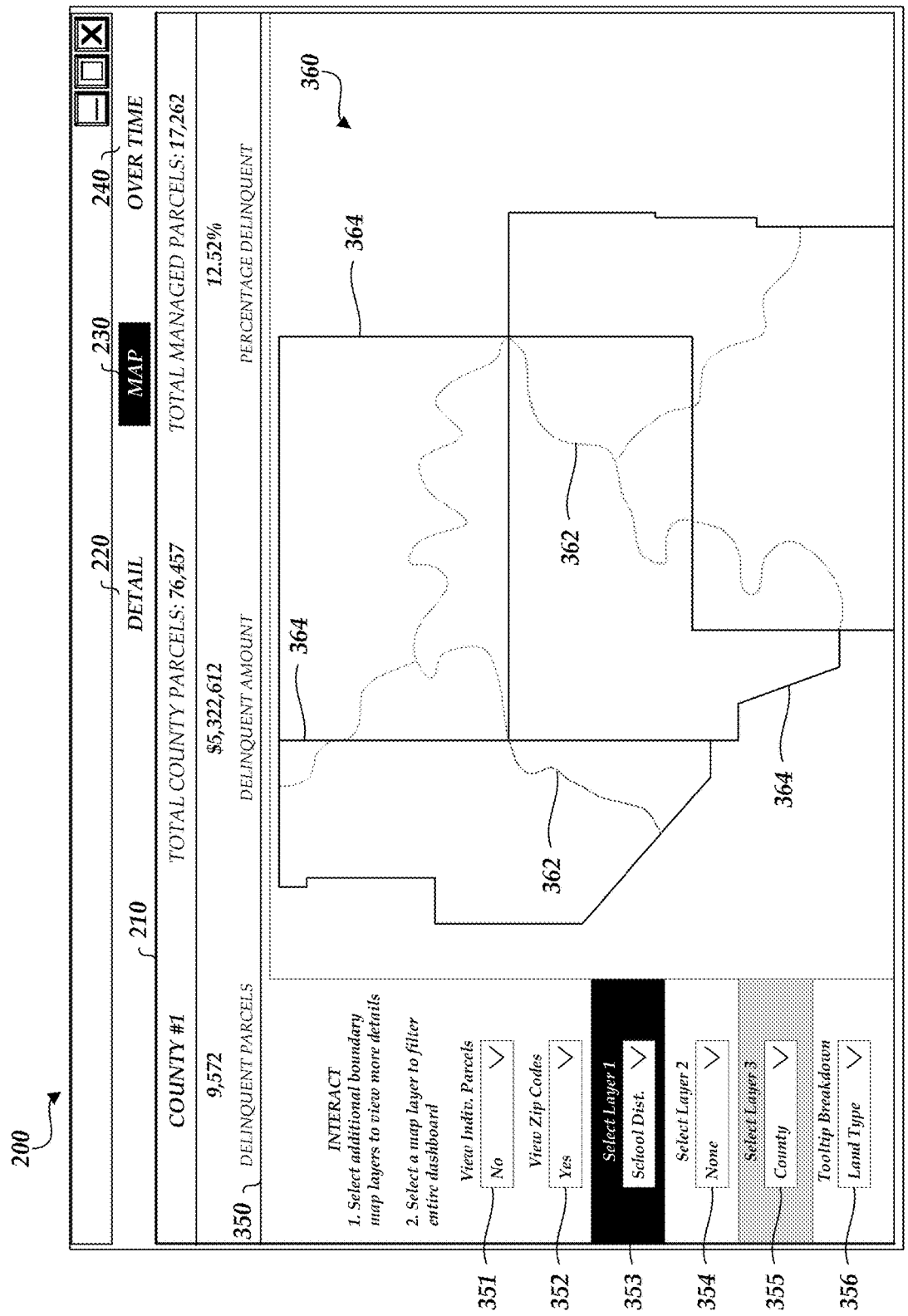
Figure 4:
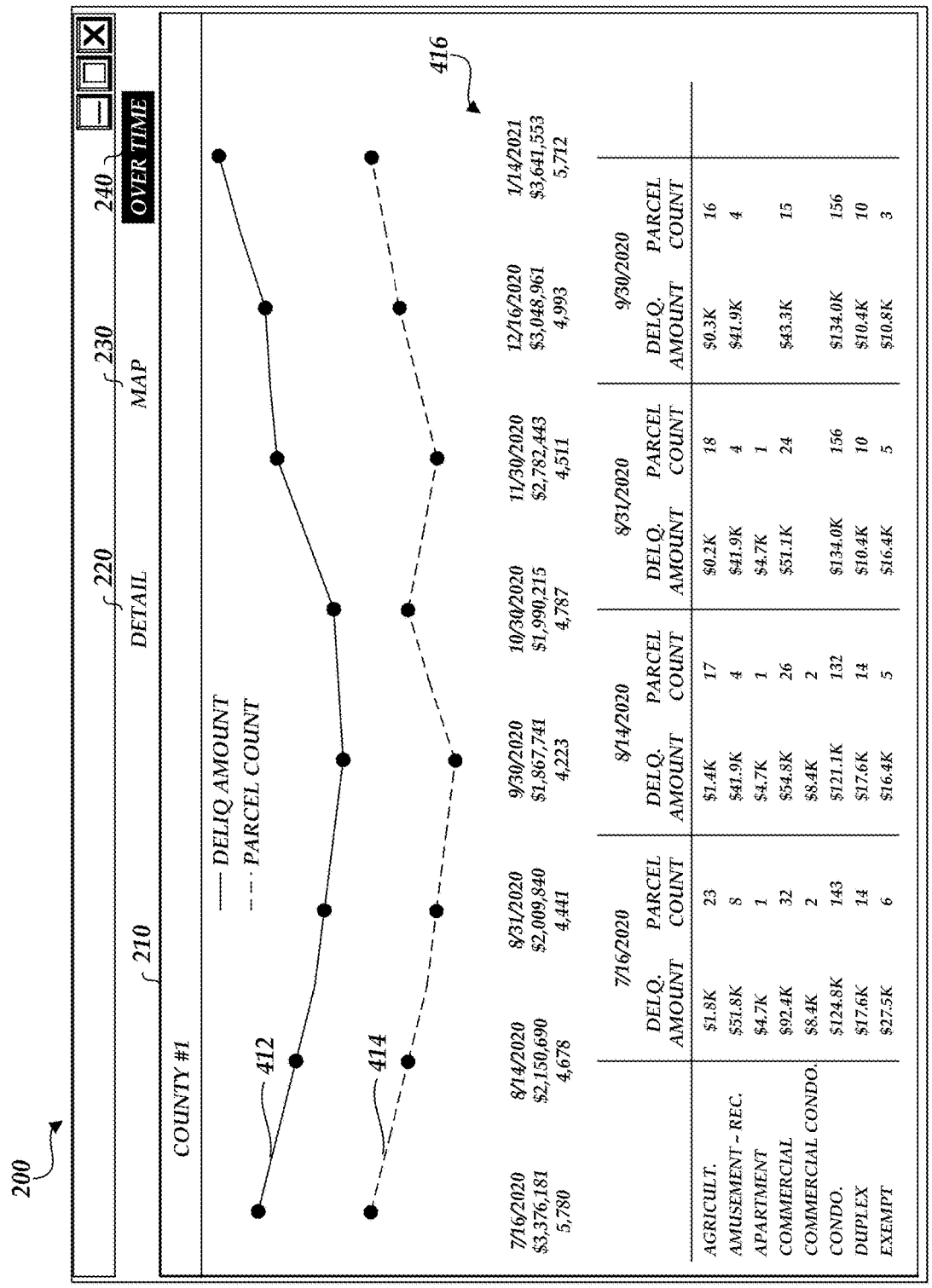

The user interface 200 also provides the option to transition from a detail view (illustrated in FIG. 2) to a map view (illustrated in FIG. 3), where the same or similar information as depicted in the user interface 200 of FIG. 2 can be overlaid on a geographic map rather than organized in a table, to an over time view (illustrated in FIG. 4). For example, the user can select detail view user interface element 220 to view the detail view illustrated in FIG. 2. The user can also select map view user interface element 230 that, when selected, causes the user interface 200 to depict menu 350 and a geographical map 360, as illustrated in FIG. 3.

The menu 350 can include dropdown menus 351-356. The dropdown menus 351-356 may allow a user to select different layers that become visible in the geographical map 360. For example, the geographical map 360 may depict a boundary map overview for individual parcels and/or different land types within a particular county (e.g., count #1). A user can interact with a geographical representation of the county (e.g., the geographical map 360), such as by selecting boundary map layers via dropdown menus 351-352 and/or selecting map layers via dropdown menus 353-355 to filter to view more details on property tax delinquencies. For example, a user can select dropdown menu 351 to view individual parcels (which, when selected, causes individual parcels to appear in the geographical map 360 and/or causes other boundary map layers or map layers to disappear). A user can also select dropdown menu 352 to view zip codes. Here, the user has opted to view zip codes via the dropdown menu 352, which, when selected, caused zip code boundaries 362 to appear in the geographical map 360 and/or caused other boundary map layers or map layers to disappear (not shown). The user can also select dropdown menu 353 to select a first layer corresponding to a first land type. Here, the user has selected "school district" as the first land type via the dropdown menu 353, which, when selected, caused boundaries 364 of the corresponding land type (e.g., school districts), optionally color-coded, to appear in the geographical map 360 and/or caused other boundary map layers or map layers to disappear (not shown). The user can also select dropdown menu 354 to select a second layer corresponding to a second land type (which, when selected, causes boundaries of the corresponding land type, optionally color-coded, to appear in the geographical map 360 and/or causes other boundary map layers or map layers to disappear), can select dropdown menu 355 to select a third layer corresponding to a third land type (e.g., county) (which, when selected, causes boundaries of the corresponding land type, optionally color-coded, to appear in the geographical map 360 and/or causes other boundary map layers or map layers to disappear), and/or can select dropdown menu 356 to display a tooltip breakdown by land type, parcel, and/or geographic region (which, when selected, causes a tooltip breakdown to appear in the geographical map 360 and/or causes other boundary map layers or map layers to disappear).

Here, the user has selected land type as the tooltip breakdown via the dropdown menu 356, which causes the geographical map 360 to display in a pop-up window (e.g., a tooltip, not shown) or another portion of the user interface 200 property tax delinquency information (e.g., amount of delinquent property tax that corresponds to a land type, percentage of total delinquent property tax in the identified county that corresponds to a land type, any data depicted in the table 218, etc.) for the type of land corresponding to a portion of the geographical map 360 over which the user is hovering with a cursor or has selected via a cursor or a touch input. If instead the user had selected parcel as the tooltip breakdown via the dropdown menu 356, then the geographical map 360 would display in a pop-up window (e.g., a tooltip, not shown) or another portion of the user interface 200 property tax delinquency information (e.g., any data depicted, for example, in the table 218) specific to a parcel over which the user is hovering with a cursor or has selected via a cursor or a touch input.

The boundary map layers and/or map layers can be displayed concurrently in the geographical map 360, with one layer overlapping another layer and each layer being at least partially transparent such that all selected layers are still visible within the same, single map view. As an example, the user interface 200 in FIG. 3 has the zip code layer, the first layer (e.g., school district), the third layer (e.g., county), and the tooltip breakdown (e.g., land type) layers active. As a result, boundaries for each of these layers can be depicted in the geographical map 360 overlapping each other in the map view, with the first and third layers color-coded or shaded by varying degrees to more easily differentiate such layers from the other layers. The user interface 200 reduces the number of navigational steps a user may have to take to view property tax delinquency data for different parcels, zip codes, and/or land types because the manner in which the layers overlap while still being visible allows all of this information to be displayed in a single view rather than in multiple views (which may require a user to open multiple windows or tabs and to flip back and forth between such windows and tabs to view the same information).

As described above, a user can view an over time view. For example, the user can select over time view user interface element 240 that, when selected, causes the user interface 200 to re-render the window 210 to depict line graph 412, line graph 414, and table 416, as illustrated in FIG. 4. The line graph 412 indicates the total amount of property tax delinquent payments in the selected county at various moments in time, and the line graph 414 indicates the total number of parcels in the selected county for which property tax payments are delinquent at various moments in time. The table 416 breaks down parcels by land type, indicating the total amount of property tax delinquent payments for the respective land type and the number of parcels for which property tax payments are delinquent and that are the respective land type at various moments in time.

Optionally, the window 210 depicted in FIG. 4 may auto-update the line graph 412, the line graph 414, and/or the table 416 as new transformed assessor data and/or property tax data is obtained by the delinquent payment portal system 120 from the parcel data store 130. For example, a right-most portion of the line graphs 412 and 414 and the table 416 may depict the most recent property tax delinquent amounts and parcel counts. As new transformed assessor data and/or property tax data is obtained, the line graphs 412 and/or 414 and/or the data depicted in the table 416 may be shifted left such that the new transformed assessor data and/or property tax data corresponding to property tax delinquent amounts and parcel counts can be depicted in the right-most portion of the line graphs 412 and/or 414 and/or the table 416. The user interface generator 122 may cause the line graphs 412 and/or 414 and/or the table 416 to be updated without any user interaction and/or without requesting that the user close and re-open the user interface 200. Rather, the updates may occur even while the user interface 200 remains open and/or active. Similar auto-updates can occur with respect to the user interface 200 depicted in FIG. 2 and/or the user interface 200 depicted in FIG. 3.

Figure 5:
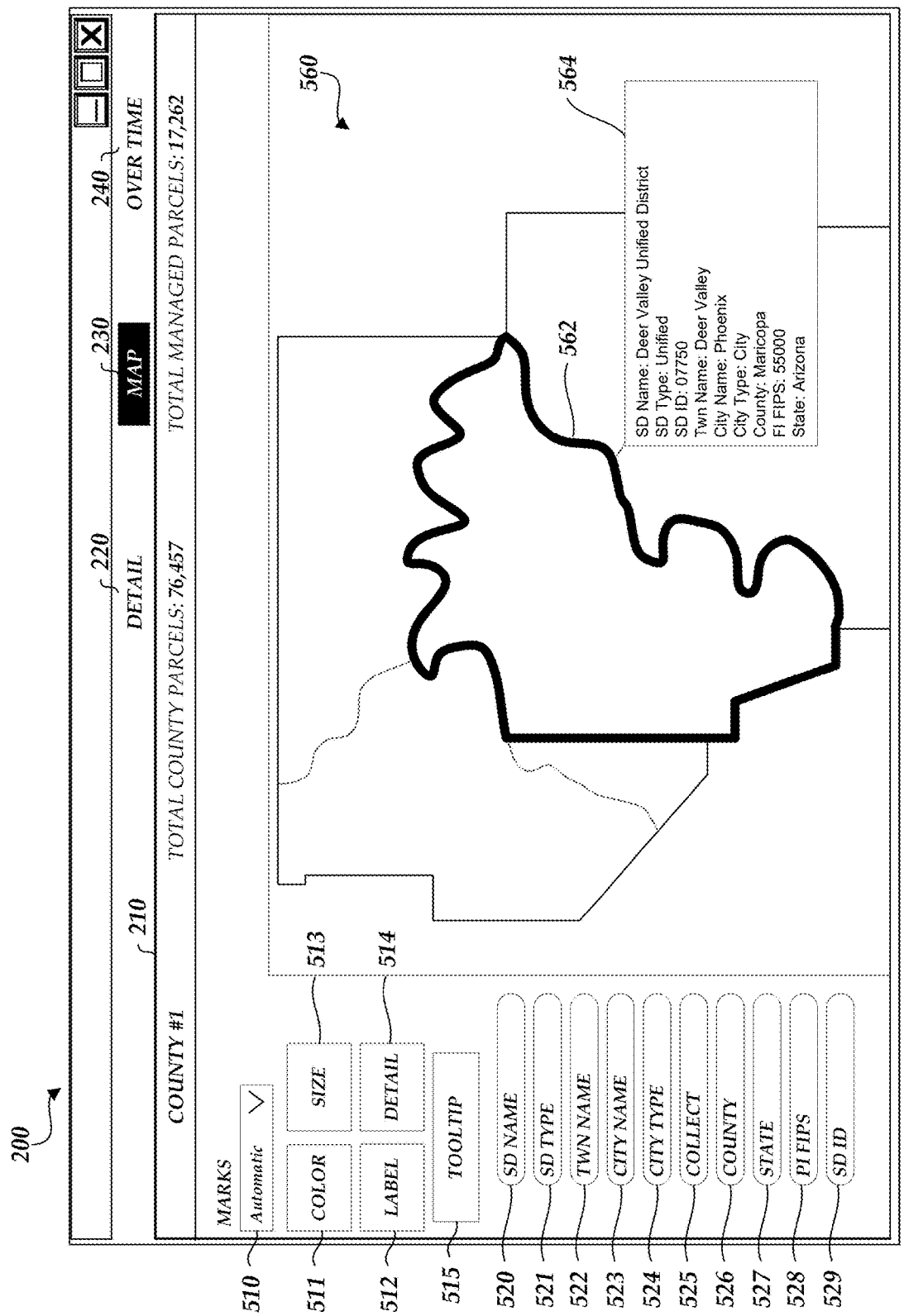

FIG. 5 depicts another map view that can be viewed by a user via the user interface 200. As illustrated in FIG. 5, a user can use various tools (e.g., zoom tools, filter tools, etc.) to modify an appearance of a geographical map 560 to identify and select a particular spatial zone 562 (e.g., a school district in this example). Once selected via the user interface 200, a tooltip 564 may appear that indicates a name of the spatial zone (e.g., "Deer Valley Unified District"), a type of the spatial zone (e.g., "Unified"), a zip code of the spatial zone (e.g., "07750"), a town (e.g., "Deer Valley"), city (e.g., "Phoenix"), county ("Maricopa"), and/or state name (e.g., "Arizona") within which the spatial zone is located, a parcel code for a state and/or individual counties within the state (e.g., a PI Federal Information Processing Standard (FIPS) number), and/or the like. Once selected via the user interface 200, the geographical map 560 may be updated to highlight the selected spatial zone, depict a location of the spatial zone with respect to other, nearby spatial zones, and allow a user to modify a color, size, label, tooltip, and/or other details of the selected spatial zone via user interface elements 510-515. The GUI may further include filters 520-529 that, when enabled, allow a user to view any of the information described above with respect to the tooltip 564 that is associated with the selected spatial zone.

Example Delinquent Payment Tracking Routine

Figure 6:
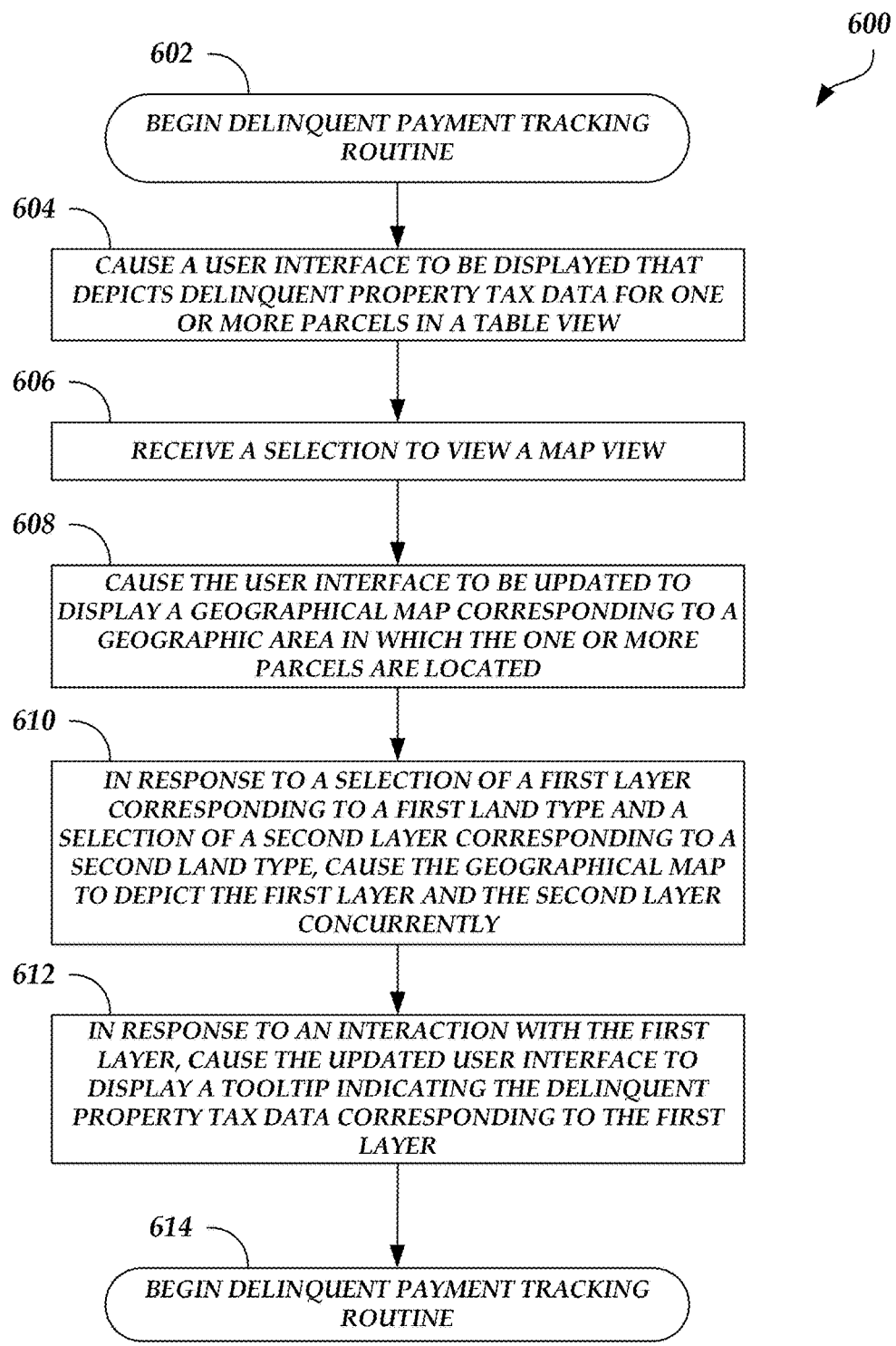
FIG. 6 is a flow diagram depicting a delinquent payment tracking routine 600 illustratively implemented by a delinquent payment portal system, according to one embodiment.

FIG. 6 is a flow diagram depicting a delinquent payment tracking routine 600 illustratively implemented by a delinquent payment portal system, according to one embodiment. As an example, the delinquent payment portal system 120 of FIG. 1 can be configured to execute the delinquent payment tracking routine 600. The delinquent payment tracking routine 600 begins at block 602.

At block 604, a user interface is caused to be displayed that depicts delinquent property tax data for one or more parcels in a table view. For example, the user interface may be similar to the user interface 200 of FIG. 2, where the depicted delinquent property tax data may be some or all of the specific property tax delinquency information depicted in the table 218.

At block 606, a selection to view a map view is received. For example, the user interface may initially display a detail view prior to the selection to view the map view.

At block 608, the user interface is caused to be updated to display a geographical map corresponding to a geographic area in which the one or more parcels are located. For example, the displayed geographical map may be similar to the geographical map 360. Within the updated user interface, the user can select to view one or more layers to eventually view delinquent property tax data corresponding to those layer(s).

At block 610, in response to the selection of a first layer corresponding to a first land type and a selection of a second layer corresponding to a second land type, the geographical map is caused to depict the first layer and the second layer concurrently. For example, the first and second layers may partially or completely overlap. The first and second layers may be color-coded differently and/or shaded by different degrees such that both layers may be visible even if at least partially overlapping.

At block 612, in response to an interaction with the first layer, the updated user interface is caused to display a tooltip indicating the delinquent property tax data corresponding to the first layer. For example, the interaction can include hovering over the first layer with a cursor or selecting the first layer using a cursor or a touch input. An interaction with the first layer can include placing a cursor or providing a touch input over a portion of the geographical map that corresponds to the first layer. The delinquent property tax data that is displayed in the tooltip may be dependent on the type of tooltip breakdown selected by the user in a menu adjacent to the geographical map. As an illustrative example, the delinquent property tax data that is displayed in the tooltip may be a percentage of a total amount of delinquent payments in a county that is attributable to a land type of the selected portion of the geographical map if the selected type of tooltip breakdown is land type. After the tooltip is displayed, the delinquent payment tracking routine 600 may end, as shown at block 614.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A delinquent payment portal system, the delinquent payment portal system comprising:
    memory storing computer-executable instructions; and
    a hardware processor in communication with the memory, wherein the computer-executable instructions, when executed by the hardware processor, cause the hardware processor to:
        obtain assessor data including one or more identifiers associated with a respective parcel of one or more parcels converted from a first format incompatible with the delinquent payment portal system to a second format compatible with the delinquent payment portal system and different than the first format;

cause a user interface to be displayed that depicts delinquent property tax data for the one or more parcels in a table view using the assessor data based at least in part on an identifier of the assessor data associated with a first parcel of the one or more parcels and in the second format, the assessor data indicating at least a portion of the delinquent property tax data is associated with the first parcel;

process a selection to view a map view;

cause the user interface to be updated to display a geographical map corresponding to a geographic area in which the one or more parcels are located;

in response to a selection of a first layer corresponding to a first land type and a selection of a second layer corresponding to a second land type, cause the geographical map to depict the first layer and the second layer concurrently and overlaid a graphical representation of the one or more parcels; and in response to a user interaction with the first layer, cause the updated user interface to display a tooltip indicating a portion of the delinquent property tax data corresponding to the first land type.

2. The delinquent payment portal system of claim 1, wherein the computer-executable instructions, when executed, further cause the hardware processor to process a selection of a type of tooltip breakdown, wherein the delinquent property tax data corresponding to the first land type that is indicated in the tooltip is dependent on the selected type of tooltip breakdown.

3. The delinquent payment portal system of claim 2, wherein the selected type of tooltip breakdown comprises a land type.

4. The delinquent payment portal system of claim 3, wherein the delinquent property tax data corresponding to the first layer that is indicated in the tooltip comprises a percentage of a total amount of delinquent payments in a geographic area that comprises the one or more parcels that is attributable to the first land type.

5. The delinquent payment portal system of claim 1, wherein the first and second layers at least partially overlap.

6. The delinquent payment portal system of claim 5, wherein the first layer is depicted with a first color and the second layer is depicted with a second color different than the first color.

7. The delinquent payment portal system of claim 5, wherein the first layer is depicted with a color having a shade of a first degree and the second layer is depicted with the color having a shade of a second degree different than the first degree.

8. The delinquent payment portal system of claim 1, wherein the delinquent property tax data comprises, for the one or more parcels, at least one of an account name associated with the respective parcel, a tax identifier associated with the respective parcel, an amount of property tax for the respective parcel that is delinquent, a year in which a delinquent property tax for the respective parcel was first billed, an installment with which the delinquent property tax for the respective parcel was first billed, a land type of the respective parcel, a city within which the respective parcel resides, or a zip code within which the respective parcel resides.

9. The delinquent payment portal system of claim 1, wherein the first land type comprises one of vacant, single family residence, condominium, utilities, agricultural, commercial, retail, warehouse, service, hotel, motel, or duplex.

10. A computer-implemented method comprising:

obtaining assessor data including one or more identifiers associated with a respective parcel of one or more parcels converted from a first format incompatible with the delinquent payment portal system to a second format compatible with the delinquent payment portal system and different than the first format;

causing a user interface to be displayed that depicts delinquent property tax data for the one or more parcels in a table view using the assessor data based at least in part on an identifier of the assessor data associated with a first parcel of the one or more parcels and in the second format, the assessor data indicating at least a portion of the delinquent property tax data is associated with the first parcel;

receiving a selection to view a map view;

causing the user interface to be updated to display a geographical map corresponding to a geographic area in which the one or more parcels are located;

in response to a selection of a first layer corresponding to a first land type and a selection of a second layer corresponding to a second land type, causing the geographical map to depict the first layer and the second layer concurrently and overlaid a graphical representation of the one or more parcels; and in response to a user interaction with the first layer, causing the updated user interface to display a tooltip indicating a portion of the delinquent property tax data corresponding to the first land type.

11. The computer-implemented method of claim 10, further comprising receiving a selection of a type of tooltip breakdown, wherein the delinquent property tax data corresponding to the first land type that is indicated in the tooltip is dependent on the selected type of tooltip breakdown.

12. The computer-implemented method of claim 11, wherein the selected type of tooltip breakdown comprises a land type.

13. The computer-implemented method of claim 12, wherein the delinquent property tax data corresponding to the first layer that is indicated in the tooltip comprises a percentage of a total amount of delinquent payments in a geographic area that comprises the one or more parcels that is attributable to the first land type.

14. The computer-implemented method of claim 10, wherein the first and second layers at least partially overlap.

15. The computer-implemented method of claim 14, wherein the first layer is depicted with a first color and the second layer is depicted with a second color different than the first color.

16. The computer-implemented method of claim 14, wherein the first layer is depicted with a color having a shade of a first degree and the second layer is depicted with the color having a shade of a second degree different than the first degree.

17. The computer-implemented method of claim 10, wherein the delinquent property tax data comprises, for the one or more parcels, at least one of an account name associated with the respective parcel, a tax identifier associated with the respective parcel, an amount of property tax for the respective parcel that is delinquent, a year in which a delinquent property tax for the respective parcel was first billed, an installment with which the delinquent property tax for the respective parcel was first billed, a land type of the respective parcel, a city within which the respective parcel resides, or a zip code within which the respective parcel resides.

18. The computer-implemented method of claim 10, wherein the first land type comprises one of vacant, single family residence, condominium, utilities, agricultural, commercial, retail, warehouse, service, hotel, motel, or duplex.

19. A non-transitory, computer-readable storage medium comprising computer-executable instructions, wherein the computer-executable instructions, when executed by a computing system, cause the computing system to:

obtain assessor data including one or more identifiers associated with a respective parcel of one or more parcels converted from a first format incompatible with the delinquent payment portal system to a second format compatible with the delinquent payment portal system and different than the first format;

cause a user interface to be displayed that depicts delinquent property tax data for the one or more parcels in a table view using the assessor data based at least in part on an identifier of the assessor data associated with a first parcel of the one or more parcels and in the second format, the assessor data indicating at least a portion of the delinquent property tax data is associated with the first parcel;

process a selection to view a map view;

cause the user interface to be updated to display a geographical map corresponding to a geographic area in which the one or more parcels are located;

in response to a selection of a first layer corresponding to a first land type and a selection of a second layer corresponding to a second land type, cause the geographical map to depict the first layer and the second layer concurrently and overlaid a graphical representation of the one or more parcels; and in response to a user interaction with the first layer, cause the updated user interface to display a tooltip indicating a portion of the delinquent property tax data corresponding to the first land type.

20. The non-transitory, computer-readable storage medium of claim 19, wherein the first and second layers at least partially overlap, and wherein the first layer is depicted with a first color and the second layer is depicted with a second color different than the first color.

* * * * *